United States Patent
McDonough et al.

(10) Patent No.: US 6,519,237 B1
(45) Date of Patent: Feb. 11, 2003

(54) APPARATUS AND METHOD FOR PARALLEL SEARCHING AND CORRELATING FOR CDMA SYSTEM

(75) Inventors: John McDonough, La Jolla, CA (US); Mehraban Iraninejad, Del Mar, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/321,680

(22) Filed: May 28, 1999

(51) Int. Cl.7 .............................................. H04B 7/216
(52) U.S. Cl. ................... 370/335; 370/342; 370/350; 375/130; 375/142; 375/147; 375/150
(58) Field of Search ................................. 370/335, 342, 370/350; 375/130, 140, 142, 147, 150, 149

(56) References Cited

U.S. PATENT DOCUMENTS

| | | | | |
|---|---|---|---|---|
| 5,109,390 A | * | 4/1992 | Gilhousen et al. | 370/335 |
| 5,528,624 A | * | 6/1996 | Kaku et al. | 375/148 |
| 5,644,591 A | * | 7/1997 | Sutton | 375/142 |
| 5,781,543 A | * | 7/1998 | Ault et al. | 370/342 |
| 6,075,809 A | * | 6/2000 | Naruse | 375/147 |
| 6,188,682 B1 | * | 2/2001 | Takagi et al. | 370/342 |
| 6,208,291 B1 | * | 3/2001 | Krasner | 342/357.12 |

* cited by examiner

*Primary Examiner*—Dwayne Bost
*Assistant Examiner*—Gregory V. Old
(74) *Attorney, Agent, or Firm*—Peter Zawilski

(57) ABSTRACT

A method to expediently perform search/correlation operation between an internal pilot pseudonoise (PN) sequence and an incoming pilot PN sequence. This operation is used to acquire base stations in a Code Division Multiple Access (CDMA) system. In one embodiment, the present invention recites a method comprising several steps. First, a plurality of PN sequence values are provided internally and an input signal sample is received. The input signal sample is correlated, in parallel, with the plurality of PN sequence values. The correlation operation is performed at a rate equivalent to the input sample rate times the number of PN sequence values being correlated in parallel, assuming a resolution of one. The resultant products are respectively summed and stored in a plurality of accumulators.

5 Claims, 7 Drawing Sheets

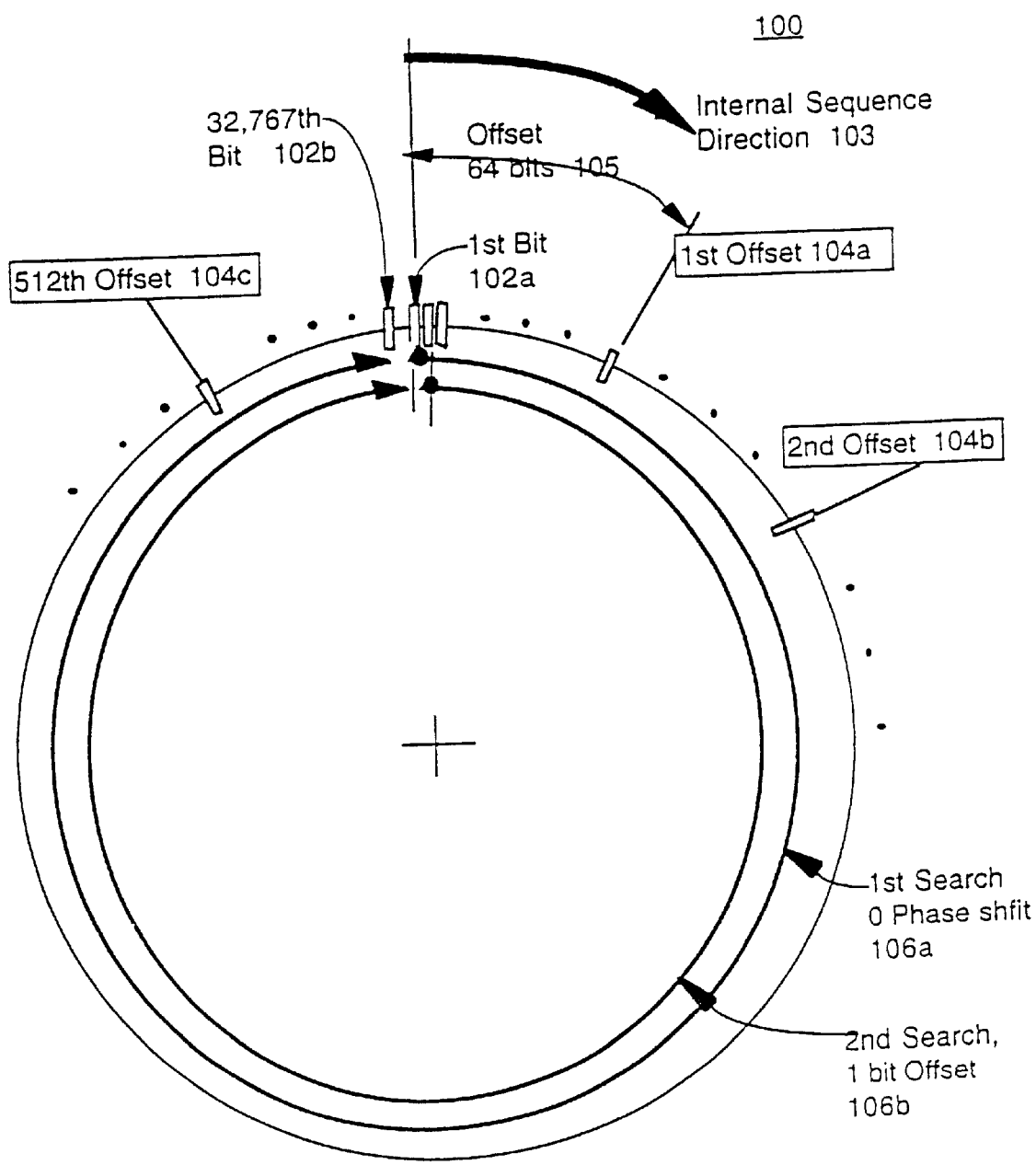
Prior Art Fig. 1a

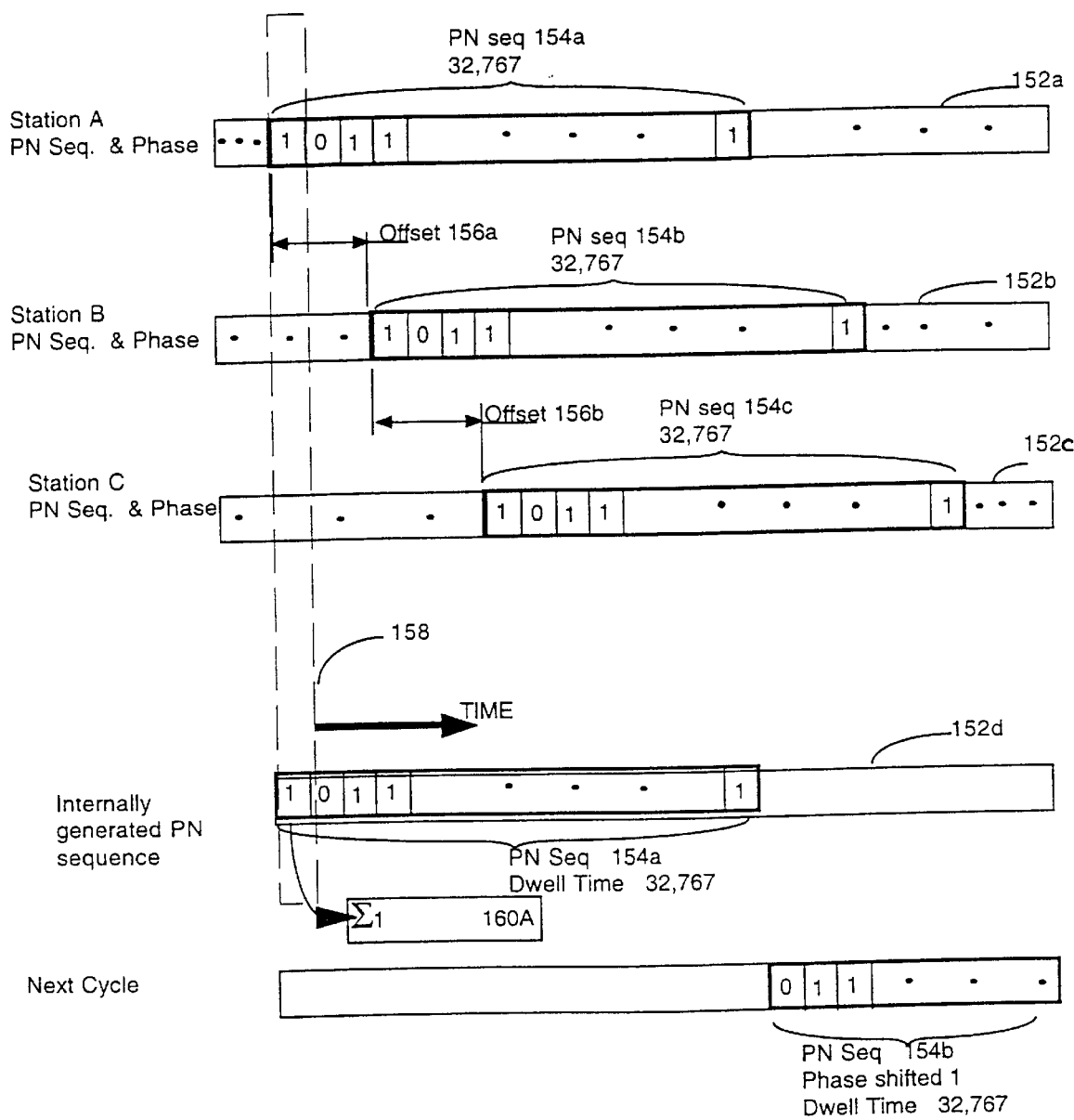
Prior Art Fig. 1b

APPARATUS AND METHOD FOR PARALLEL SEARCHING AND CORRELATING FOR CDMA SYSTEM

TECHNICAL FIELD

The present invention pertains to the field of wireless communication technology. More specifically, the present invention pertains to a method and apparatus that uses parallel operations to speed the process of acquiring Code Division Multiple Access (CDMA).

BACKGROUND ART

Wireless telephony, e.g. cellular phone use, has become a widely available mode of communication in modern society. Code Division Multiple Access (CDMA) spread spectrum systems are among the most commonly deployed wireless technology.

CDMA utilizes digital encoding for every telephone call or data transmission in order to provide privacy and security. Unique codes are assigned to every communication, which distinguish it from the multitude of calls simultaneously transmitted over the same broadcast spectrum. Users share time and frequency allocations and are channelized by unique assigned codes. The signals are separated at the receiver in a known manner so that the receiver accepts only signals from the desired channel.

Cell phones can roam throughout the country and appear to operate seamlessly to the user. This feature is possible because hundreds of base stations, located throughout the country, allow relatively local transmission and reception of data signals. The roaming feature of cell phones is accomplished by using hard and soft hand-offs between base stations. However, because cell phones have the capability to communicate with any of the different base stations, assuming contractual access and operating system compatibility, a system and method is needed for the cell phone to determine if there are any nearby base stations and which of them have the strongest power signal. Furthermore, a need for a method of how to identify each of the base stations is required.

It is desirable for the cell phone to communicate with the base stations having the strongest signal. This will typically provide the best quality of service in terms of signal reproduction at the cell phone. While the strongest power signal is usually the closest base station, natural or man-made geographical obstructions may prevent the closest basestation from providing the strongest signal. Thus, for example, the second-closest base station may provide the strongest transmission signal. The strongest signal is rated in terms of the power of the signal received at the cell phone.

CDMA systems transmit waveforms from multiple base stations occupying the same frequency band. Hence, multiple signals combine their amplitude on the airwaves. However, because these signals are encoded with a pseudonoise (PN) sequence, they have special properties. First, they can only be interpreted by a receiver that knows the given PN sequence and the phase shift used on the PN sequence. To a user without the code, the signal appears as noise. To the user given the code, the signal is only not noise because it contains usable information once the signal is decoded. Hence the term "pseudo" noise. A CDMA standard establishes a plurality of usable codes which are assigned to users for channelization. The term code division multiple access is descriptive of the process because it divides a limited number of usable codes among multiple users according to their need, capability, and contracted service.

CDMA digital cellular systems, such as that specified in the IS-95 CDMA standard, uses two specific pilot PN code sequences, e.g. one for the in-phase condition and one for the quadrature phase condition, that every base station transmits in quadrature as a pilot signal. The pilot signal is a pseudonoise binary sequence which may be generated by a Linear Feedback Shift Register (LFSR). Each base station is assigned a phase shift at which it can transmit the specific codes. Cell phones can identify and distinguish different base stations by detecting pilot energy at different phase shifts. Hence, the phase shift is the key to uniquely identifying local base stations.

Referring to Prior Art FIG. 1a, a circular diagram 100 of the pilot PN code sequence is illustrated. Box 102a represents the first bit of the 32,768 binary values used for the PN code sequence. This PN code sequence is one of the two PN code sequences used in the quadrature modulation. Similarly, box 102b represents the last bit of the 32,678 binary values. Hence, the sequence has a period of 32,768 values. Because the code is periodic, it repeats itself. The pilot PN sequence can be phase shifted among a plurality of base stations so that they do not all transmit the same code at the same phase shift. Rather, they transmit the same code at different phase shifts. Because the sequence is a PN sequence, all transmissions of the code appear as pseudonoise unless they are evaluated at the precise phase shift at which they are transmitted. The IS-95 CDMA standard divides the length of the 32,768 bit pilot PN sequence into a total of 512 possible phase shifts, each separated by a phase shift of 64 bits, e.g. 32,768/64=512, as shown by item 106. The base stations are synchronized to each other by a standard time process, such as Global Positioning System (GPS) timing.

A cell phone checks for phase shift by generating the same single specific code sequence inside the cell phone itself, then correlating it to the input signal. However, while the cell phone can easily generate the single specific code, it does not know the phase shift of the base stations with respect to the received input signal. This is because the cell phone is not synchronized to any base stations when it is first trying to acquire base stations in the CDMA system. Thus, the cell phone must phase shift its internally generated specific code, by offsetting the code sequence, and then correlate it again to the input signal. A good correlation value usually means that two identical signals, e.g. identical PN sequences, are in phase. This process of phase shifting the internally generated specific code and correlating it to the input signal is repeated until the cell phone has checked all the possible phase shifts of the code. The process and apparatus used to phase shift the specific code and to perform the checking is referred to as a searcher, among other names. The base stations constantly transmit their pilot signal in a periodic fashion, so it is always available to be received by the cell phone, barring interference, etc.

Referring to Prior Art FIG. 1b, a search/correlate operation on a hypothetical PN pilot signal 150, transmitted at different phases from different base stations, and on a pilot PN sequence, provided within a cell phone, is illustrated. This figure provides an illustration of how a pilot PN sequence is transmitted from a plurality of base stations, of when the pilot PN sequence is generated within a cell phone, and how the search proceeds to phase shift the internally generated pilot PN sequence to check all the different possible phase shifts of a PN sequence transmitted by a base station.

Prior Art FIG. 1b is comprised of a transmitted PN pilot signal 152a, with a phase shift, from Base Station A; a transmitted PN pilot signal 152b, with a phase shift, from Base Station B; and a transmitted PN pilot signal 152c, with a phase shift, from Base Station C. The three dots appearing throughout the figures represents the periodic and repeating nature of the transmitted PN pilot signal. Each PN pilot signal from the base stations is the same PN sequence of 32,768 bits. However, the starting point, and subsequent sequential bit locations, are offset among between the base stations by the 64 bit offset specified in the IS-95 CDMA standard. Hence, Base station B signal 152b is offset from Base station A signal 152a by an offset 156a, which is a multiple of 64 bits. Similarly, Base station C is offset from base station B by an offset 156b, which is a multiple of 64 bits.

In another scenario, there is no input signal because there is no service provided in a specific region, or because the signal is blocked by a natural or man-made obstruction. The controller within the cell phone checks the power level of all the combinations of input signal over the different phase shifted internally generated specific code to find the highest power base station, the second highest power base station, etc.

In the prior art, the internally generated pilot PN sequence 152d, is correlated one bit at a time with the incoming signal. A conventional correlation/search may be performed by multiplying the signal and sequence bit by-bit, summing the result over a dwell time to generate a correlation, and squaring the sum to minimize frequency error, and thereby obtain the power of the correlated signal. The initial internally generated pilot PN sequence 154a is initialized from a given starting point, e.g. no phase shift, when a cell phone is turned on since the sequence has nothing else to which it may be synchronized.

In the prior art, after the correlation/search is performed for a given pilot PN sequence, e.g. with no phase shift, the internal pilot PN sequence is phase shifted one bit, e.g. by initializing the LFSR with a different mask input. The mask input effectively generates a phase shift in the PN sequence. Then the cell phone repeats the correlation/search process for the newly phase-shifted pilot PN sequence. The process of phase shifting the internal pilot PN sequence is continued until an internal pilot PN sequence is generated for every phase shift, e.g. about 32,768 shifts, including the no phase-shift version.

As indicated in Prior Art FIG. 1b, the search/correlate operation is performed on each internal pilot PN sequence, in a serial fashion. However, because the search/correlation operation has a long dwell time for each phase shift of the PN sequence evaluated, and because the pilot PN sequence is so long, the overall procedure is very time consuming. Thus, a conventional cell phone may take up to 30 seconds or longer to acquire the CDMA system, e.g. established the base stations with which it will communicate. A long search time has several negative consequences. First, it is inconvenient for a user to wait for a searching and acquisition operation. Second, the correlation information obtained at the beginning of a search/correlation operation may be invalid at the end of the search/correlation operation if the operation takes too much time. This is because communication variables can change so quickly. For example, transmission and reception variables such as drift, bounce, multipathing, interference, physical obstructions, and mobile phone location can all change quickly when dealing with a mobile wireless communications system. Hence, a need arises for a more expedient method to perform a search/correlation operation.

In summary, a system and method is needed for the cell phone to identify nearby base stations and to determine the phases of associated multi-path components. Furthermore, a need exists for a method of how to identify each of the base stations. Additionally, a need arises for a more expedient method to perform a search/correlation operation.

DISCLOSURE OF THE INVENTION

The present invention provides a method and apparatus to identify nearby base stations and to determine the phases of associated multi-path components. Additionally, the present invention provides a more expedient method to perform a search/correlation operation.

In one embodiment, the present invention recites a method comprising several steps. When a cell phone is turned on, it tries to acquire the CDMA system by searching for a local base station with a strong signal. The strength of the base station's signal is determined by evaluating a pilot signal having a known PN sequence. Base stations transmit these pilot signals so that users can identify the phase shift and power level of the balance of the signals transmitted by the base station. For best transmission quality, the base station with the highest power level is typically preferred. The cell phone internally generates the same pilot PN sequence that is transmitted from the base station. However, the phase of the incoming PN sequence signal is not known. Hence, the internally generated PN sequence can start at any point in the PN sequence, as long as subsequent indexing and phase shifting accounts for the actual start point. The cell phone receives an in-phase (I) component and a quadrature phase (Q) component of an input signal which it tries to match with its own internal in-phase (I) PN sequence and quadrature phase (Q) PN sequence, respectively.

The input signal represents the composite signal from all nearby base station transmitters across a common bandwidth but having a different phase shift in its pilot PN code for each base station. In the present embodiment, a random search/correlate rate of sixteen is chosen. The cell phone generates a set of sixteen sequential PN code values for the I phase and sixteen sequential PN code values for the Q phase, for correlation with the respective I phase and Q phase of the first input signal sample. Instead of simply correlating a single input signal sample times a single internally generated PN code sequence, the present invention correlates two samples from the input, e.g. ½ chip resolution, with sixteen sequential PN code sequences and accumulates the results in thirty-two memory registers for each phase. These operations will occur within the time period of the input sample. Thirty-two accumulators will be required for the I phase, and 32 accumulators will be required for the Q phase.

After the correlation of the first sixteen sequential PN code values for each phase, a new input signal sample is received, and the PN code sequence for each phase is indexed to accommodate a new sequential PN code value provided for each phase. The new single input signal sample, for each phase, is correlated to each of the sixteen PN code values, for each phase, and accumulated in the respective accumulator. In this fashion, the present invention performs a parallel correlation operation that has a width of sixteen phase shifts. In order to be performed in parallel, the correlation operation between a single input signal sample and sixteen PN code sequences has to be performed at a rate sixteen times faster than the rate the input signal is supplied. This operation occurs in parallel for both the I phase and the Q phase. Furthermore, parallel engines can carry on duplicate operations on the I phase and the Q phase if greater precision is desired for the input sample.

With an input signal rate of 1.2288 MHz, the internal correlation operation will perform at a clock speed of approximately 19.6608 MHz to perform sixteen parallel correlation operations. Correlation is understood to include despreading and accumulation of the input signal sample and the PN sequence values. The internal PN sequence is continually indexed, the input signal samples are continuously received, and the correlation between the two is continued until a desired number of cycles have been accumulated, or integrated. The integration used for this step can be referred to as coherent integration.

After the number of cycles specified for the first integration has been accomplished, the accumulated values from the correlation operation, for the I and Q phases, are squared, then summed to provide an energy value, then stored in a second set of accumulators, referred to herein as energy accumulators. The product accumulators are then reset to zero. These steps represent a single cycle with respect to the second set of accumulators, or integrators. The integration used in this step can be referred to as noncoherent integration.

Energy accumulators continue to accumulate energy values for a specified number of cycles. The number of cycles in the first integration times the number of cycles in the second integration is referred to as the dwell time. After the number of cycles for the second integration has been satisfied, several things occur. First the values from the energy accumulators are transmitted to a controller for evaluation of the energy signal values and subsequent ranking. Second, the energy accumulators are reset. Third, the internally generated PN sequence is phase shifted to a new window. For example, if phase shifts 0 through 15 were represented by the PN sequence used through the dwell time, then the PN sequences are indexed to effectively provide phase shifts of 16 through 31. Then the aforementioned correlation and accumulation operations are repeated for the specified dwell time. In this manner, the internal PN sequence is systematically phase shifted all the way around the PN sequence period, and correlated to the incoming signal.

Thus, the present invention provides a method that performs a parallel correlation/search operation. In this manner, the present invention can obtain the CDMA system at least sixteen times faster than the conventional serial method.

These and other objects and advantages of the present invention will no doubt become obvious to those of ordinary skill in the art after having read the following detailed description of the preferred embodiments illustrated in the various drawing figures.

BRIEF DESCRIPTION OF THE DRAWINGS

The accompanying drawings, which are incorporated in and form part of this specification, illustrate embodiments of the invention and, together with the description, serve to explain the principles of the invention. The drawings referred to in this description should be understood as not being drawn to scale except as specifically noted.

PRIOR ART FIG. 1a is a circular diagram of the conventional pilot PN sequence is illustrated.

PRIOR ART FIG. 1b is a search/correlate operation on a hypothetical PN pilot signal transmitted at different phases from a different base stations and of a pilot PN sequence generated within a cell phone.

BEST MODE FOR CARRYING OUT THE INVENTION

Figure 2:
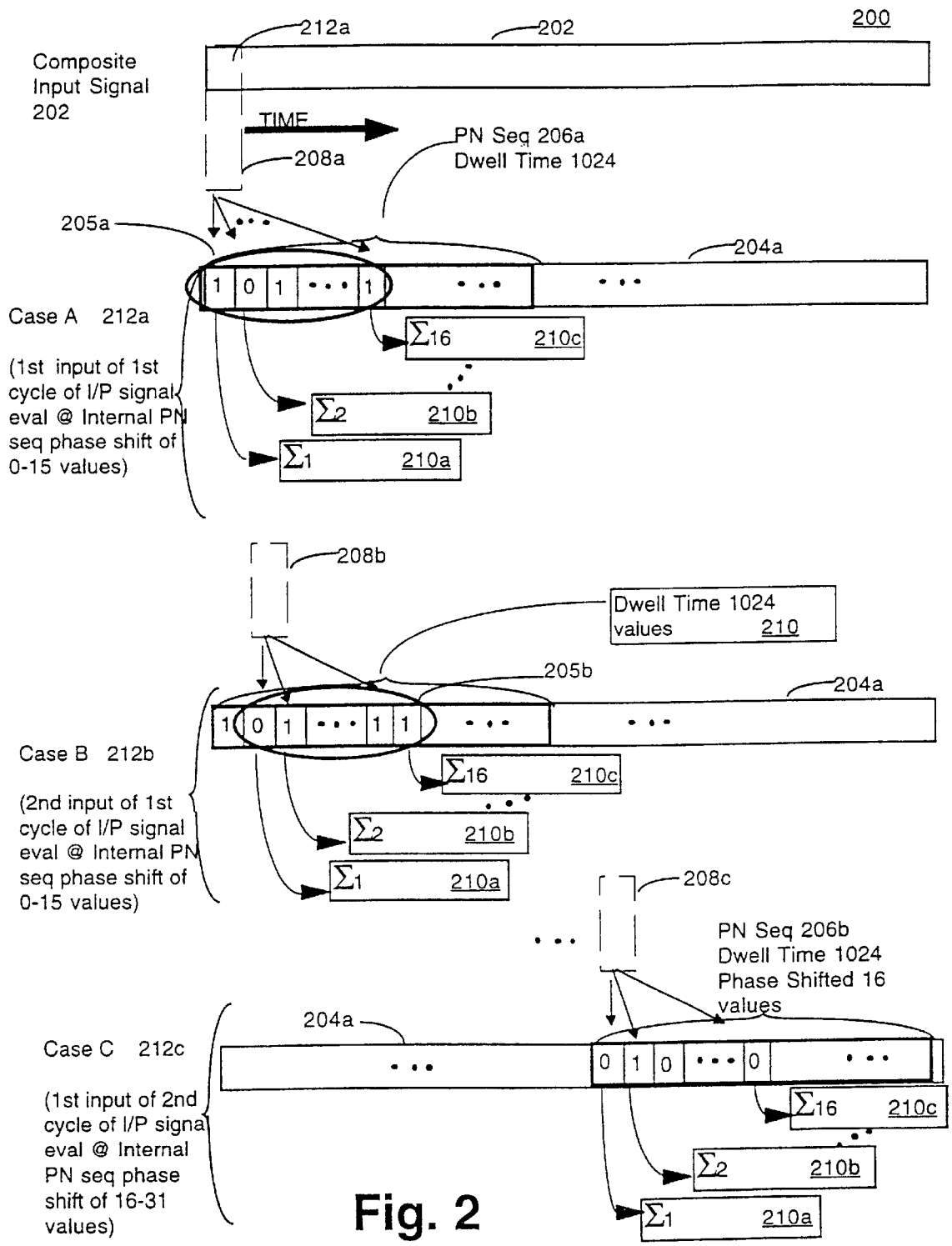
FIG. 2 is an expedient search/correlate operation on a hypothetical PN pilot signal transmitted at different phases from a different base stations and of a pilot PN sequence generated within a cell phone, in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions which follow, e.g., the processes, are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, correlated and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, terms such as "providing," "receiving," "multiplying," "correlating," "writing," "repeating," "despreading," or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Referring now to FIG. 2, an expedient search/correlate operation 200 on a hypothetical example is presented, in accordance with one embodiment of the present invention. The expedient search/correlate operation is performed on a hypothetical composite input signal 202 made of a PN pilot signal transmitted at different phases from different base stations and of a pilot PN sequence, e.g. 206a, generated within a cell phone. The components of FIG. 2 will be described herein. However, the operation of the components in the figure will be explained hereinafter as applied to a flowchart describing the expedient search/correlation operation.

For purposes of clarity, FIG. 2 uses the same hypothetical PN pilot signals received from various base stations used in FIG. 1a. However, the PN pilot signal in FIG. 2 is presented as a single composite input signal. FIG. 2 illustrates several "snapshots" in time of the correlate/search operation being performed between input samples and internally generated PN sequence values. The various snapshots illustrate different phase shifts occurring at different times in the correlate/search operation. Case A 212a illustrates a first PN sequence having zero phase shift from the PN sequence specified in the CDMA standard IS-95. In other words, the PN sequence used in the example starts at the beginning of the period of the standard PN sequence. Case A 212a also illustrates a time frame 208a where a first input signal 212a sample is received by the searcher circuit within the cell phone. The first input signal sample 212a is typically a multi-bit value, as converted from the analog to digital converter from the received analog signal.

First input signal sample 212a is subsequently correlated, in parallel, with 16 internally generated consecutive PN values 205, within the period of an input signal sample, e.g. 1/1.2288 Mcps≅813 nanoseconds. The correlation operation includes a step of despreading the input signal sample with the internally generated PN sequence values, and accumulating the results in sixteen separate accumulators 210a through 210c. Likewise, by correlating the first input signal sample by the third PN sequence value, a phase shift of two is evaluated for the first input signal sample. Thus, the parallel operation of sixteen phase shifts, e.g. from zero to fifteen inclusive, on a PN sequence is accomplished by providing a buffer of 16 PN sequence values and by accumulating the sums from the parallel correlation in a plurality of product accumulators. Note that FIG. 2 only represents one phase of the two-phase system. Hence, a parallel operation would be required for the second phase. Additionally, this illustration assumes a resolution of one for the input signal sample. For higher resolution, parallel processes would be used.

Similarly, Case B 212b illustrates a second input sample being correlated, in parallel, with 16 internally generated PN values. The 16 internally generated PN sequence values used for case B are incremented by one value from the 16 PN sequence values used for Case A. This increment in the PN sequence corresponds to the input signal sample being incremented by one. Thus, the second input signal sample is multiplied by the first PN sequence value in the newly indexed 16 bit PN sequence. This represents a phase shift of zero between the second input signal sample and the internally generated PN sequence. Because the second input signal sample is also multiplied by the first through the sixteenth PN value in the newly indexed 16 PN sequence, the second input signal sample is evaluated at the same phase shifts, e.g. 0–15, performed for the first input signal sample. Because the results from respective phase shifts are summed in respective product accumulators 210a through 210c, the total results for each phase shift is tracked.

These steps are repeated until a specified dwell time between the input signal and the internal PN sequences is satisfied. After the dwell time is satisfied, the internally provided PN sequence will be indexed to represent increasingly greater phase shifts. That is, after phase shifts of 0–15 are evaluated over the dwell time, the internally generated PN sequence is indexed to represent phase shifts of 16–31. The new PN sequences representing phase shifts of 16–31 are then correlated with the input signal for the specified dwell time. This entire process is repeated until phase shifts representing the period of the PN sequence have been correlated.

Several alternatives exist for the limitations used in FIG. 2. For example, FIG. 2 uses a PN sequence length of 32,768. However, the example and the present invention is applicable to any PN sequence length, so long as it is accounted for in the hardware and firmware. Additionally, FIG. 2 uses a parallel search/correlation to 16 consecutive PN sequence values, e.g. an S=16 bit array. However, the example and the present invention is applicable to any quantity of PN sequence values being searched/correlated, so long as it is accounted for in the hardware and firmware. Also, FIG. 2 uses an initial set of values for the PN sequence equivalent to the actual start of the PN sequence. This corresponds to a phase-shift of zero from the standard PN sequence. However, the present invention is applicable to using any starting point of the PN sequence, so long as it is accounted for in subsequent operations. Finally, the data in FIG. 2 uses a resolution of one. That is, only one sample is used for a given input sample period. However, the present invention is applicable to any resolution, so long as it is accounted for in hardware, or in quantity of PN sequences evaluated.

Figure 3A:
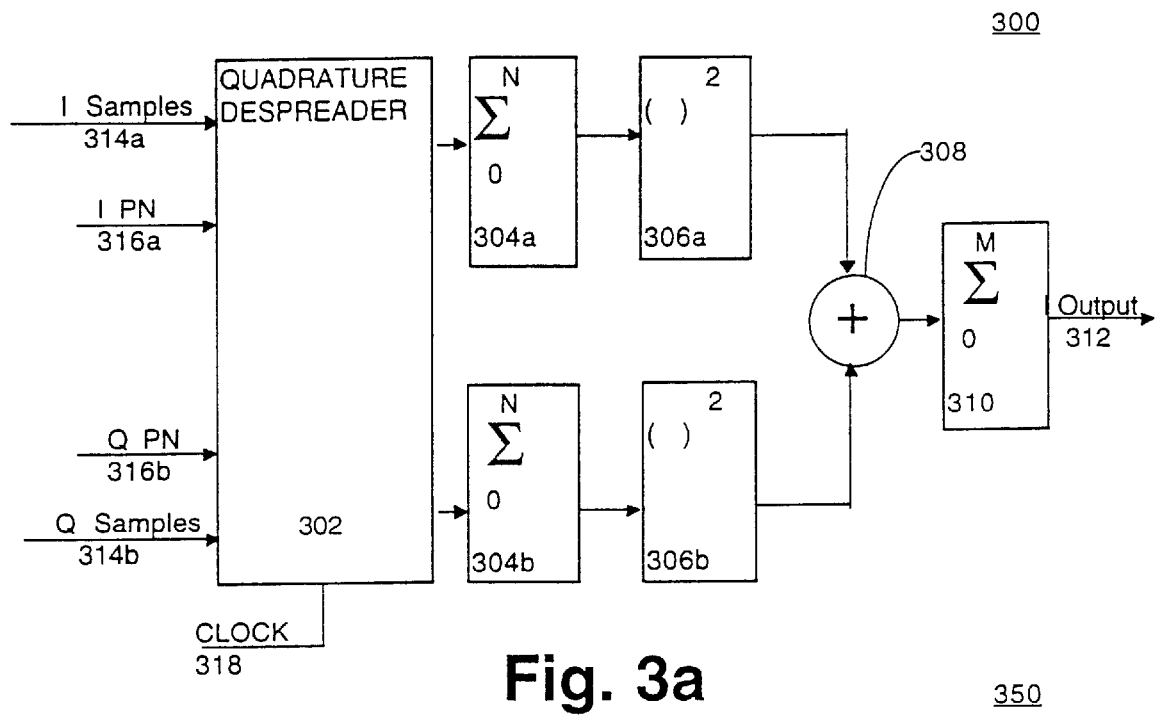
FIG. 3a is a system block diagram of an expedient searcher, in accordance with one embodiment of the present invention.

FIG. 3a is a system block diagram of an expedient searcher 300, in accordance with one embodiment of the present invention. Expedient searcher is comprised of a quadrature despreader block 302 coupled to a first integrator 304a, or accumulator, receiving the I component of input signal sample and the I PN sequence value. First integrator 304a integrates for N cycles. Quadrature despreader block 302 is also coupled to a second integrator 304b, or accumulator, for receiving the Q component of the input signal sample and the Q PN sequence value. Second integrator block 304b integrates for M cycles. First integrator 304a is coupled to first squaring block 306a. Similarly, second integrator 304b is coupled to second squaring block 306b. Both the first squaring circuit 306a and the second squaring circuit 306b are coupled to summer 308. In turn, summer 308 is coupled to an energy accumulator 310 that adds the squared values calculated for both phases to obtain an energy value. An output lead 312 communicates the values from the energy accumulator to a controller for subsequent processing. Alternatively, output lead 312 could communicate the values to a central processing unit or a Digital Signal Processor (DSP) for subsequent processing. FIG. 3a thus provides blocks for parallel correlating/searching of both phases.

Figure 3B:
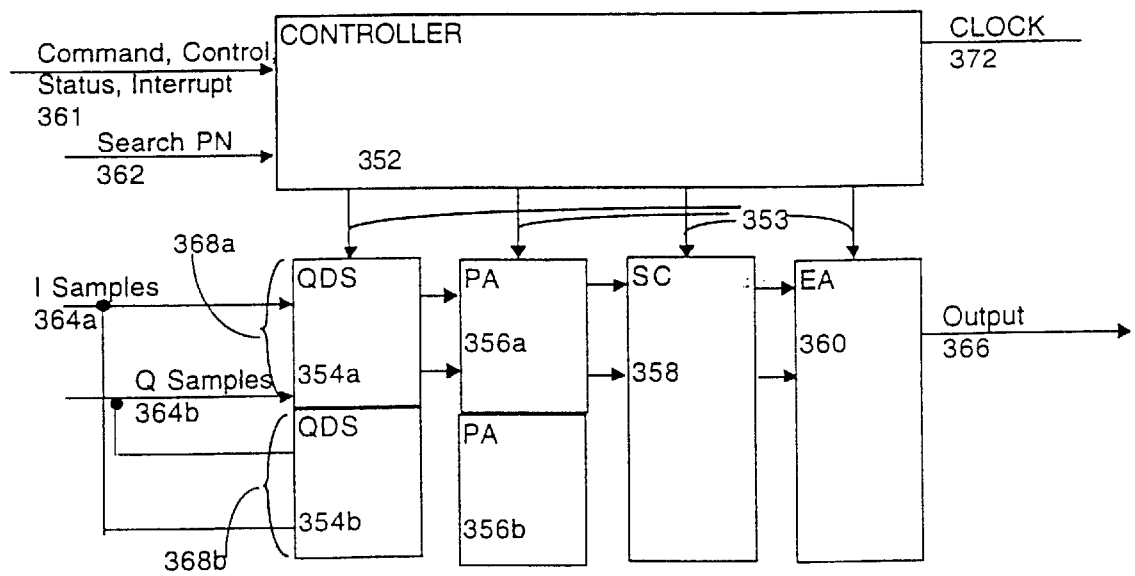
FIG. 3b is a hardware diagram of an expedient searcher, in accordance with one embodiment of the present invention.

FIG. 3b is a hardware diagram of an expedient searcher 350, in accordance with one embodiment of the present invention. Searcher is comprised of a controller 352 coupled to a first and second searcher quadrature despreader (QDS) 354*a* and 354*b*, to a first and second product accumulator (PA) 356*a* and 356*b*, to a squaring circuit (SC) 358, and to a energy accumulator (EA) 360. First QDS 354*a*, first PA 356*b*, and respective portions of SC 358 form a first engine 368*a* of searcher 350. Similarly, second QDS 354*b*, second PA 356*b* and respective portions of SC 358 form a second engine 368*b* for searcher 350.

First engine 368*a* and second engine 368*b* each have the capacity to process 32 hypotheses. Thus for a resolution of ½ the chip, 16 PNs can be correlated. In terms of the hardware, first search engine 368*a* could handle the first half of the internal PN values, e.g. I and Q values for PN bits 0 through 7 of the sixteen bit PN sequence window, while second engine 368*b* could handle the second half of the internal PN values, e.g. I and Q values for PN bits 8 through 15. But because the clock rate is only 16 times the input period, a first engine evaluates 16 hypothesis while the second engine evaluates the remaining 16 hypothesis. The present invention is applicable to rearranging these numbers for a users needs or capabilities, provided the hardware and firmware are changed appropriately. Finally, while the present embodiment refers to a standard chip rate and a specific cell phone clock speed, the present invention is well-suited to any chip rate and cell phone clock speed, provided the hardware and firmware are provided to compensate for the differences.

Controller provides the control signals to the components so as to control the search operation according the prescribed method. With this in mind, the method embodied in subsequent flow charts will be illustrated with the present hardware FIG. 3*b*. Because controller performs controlling functions it is coupled to the typical input leads such as command, control, status, and interrupt leads 36*a*, clock lead 372, search PN lead 362, which provides internally generated PN codes to the controller. Controller is coupled to other components via leads 353, so as to provide controlling operations. Output lead 366 is provides output values from energy accumulator 360 for subsequent evaluation.

While the present embodiment utilizes a search speed sixteen times the speed of the incoming signal sample, using a resolution of 1/2 , the present invention is also well suited to any increase in speed. The parallel processing hardware and steps depends upon the cell phone's maximum available clock rate, the number of parallel engines, the desired resolution, etc.

The purpose of quadrature despreader is to perform the despreading operation. This operation includes mathematical operations such as multiplication, addition, and subtraction. With the quadrature despreader, the search operation can be performed approximately sixteen times faster than the conventional method. Clock input lead provides a clocking signal having a rate sixteen times faster than the rate at which an input signal is provided. If the input signal sample is oversampled, e.g. if two input samples are provided for a given single period of the transmission rate of the input signal to provide a resolution of 1/2 , then parallel engines can be used to operate the spreader at sixteen times the speed or greater. While the quadrature despreader in the present embodiment has the capability for sixteen operations, the present invention is applicable to a quadrature despreader having a greater or lesser capability.

The purpose of the product accumulator, PA 356*a* and 356*b*, is to accumulate respective products resulting form the parallel correlation operation. Hence, each product accumulator, e.g. for each engine, would essentially have 32 registers, assuming 1/2 resolution for I and Q phases, correlated at 16 times the input signal rate. Similarly, the EA acts as the accumulator for the summing of the energy values calculated, but only has half the registers of the PA because it sums the results from the I and Q phases. While the product accumulator and energy accumulator in the present embodiment specify a quantity of registers, the present invention is applicable to accumulators with greater or lesser quantity of registers, as is appropriate for the given resolution, correlation rate, etc.

The purpose of SC circuit 358 is to square the data value it receives. SC 358 passes the squared values to EA 360. The purpose of EA 360 is to accumulate and store the values provided from SC 358. In this manner, integration over N cycles is accomplished.

Figure 4A:
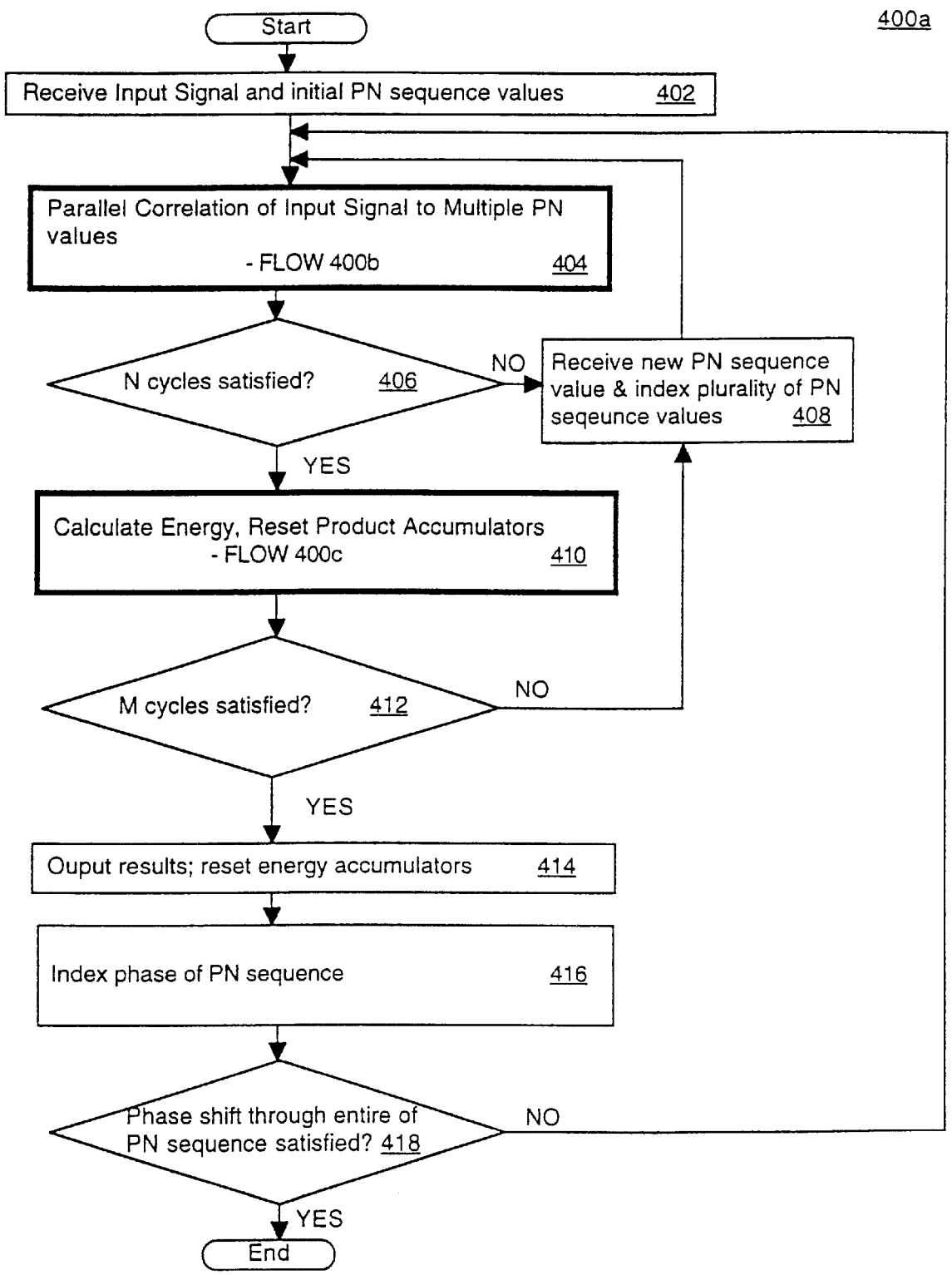
FIG. 4a is a flow chart of the steps performed to expediently perform a search operation, in accordance with one embodiment of the present invention.

Referring now to FIG. 4*a*, a flow chart 400*a* of the steps performed to expediently perform a search operation is presented, in accordance with one embodiment of the present invention. By using the present embodiment, the present invention provides a method for expedient parallel search/correlation operation. FIG. 4*a* will be illustrated, at appropriate times, in combination with hardware portions of the invention illustrated in FIG. 3*b*. Flowchart 400*a* is comprised of the following steps.

In step 402, an input signal and an initial PN sequence is received. This is essentially the initialization step of the process when the cell phone is first turned on. The acquisition of the first 16 PN sequence values on which the searcher will perform its operation occurs here. A number of alternatives exist in this area. For example, in one embodiment, a buffer is sequentially filled with 16 PN sequence values generated internally within the cell phone. Meanwhile, the cell phone patiently waits for this step prior to sampling the input signal. However, alternative initialization processes could be used to get the PN buffer up to the desired 16 PN sequence values. Because this is a quadrature system, an initial PN sequence is obtained for a I phase, and an initial PN sequence is obtained for a Q phase.

In step 404, parallel correlation of input signal to multiple PN values is performed according to flowchart 400*b*. Step 404 of flowchart 400*a* is segregated as a new flowchart, 400*b*, for purposes of clarity. With an input signal rate of 1.2288 Mcps (Million chips per second), the internal correlation operation must operate at a clock speed of approximately 19.6608 MHz to satisfy the correlation operation sixteen times faster, assuming parallel engines and 1/2 resolution. As mentioned, the present invention is applicable to different chip rates, different clock speeds, and a different quantity and resolution of parallel correlations.

In step 406, an inquiry is made as to whether the number of cycles "N" chosen for the first integration operation have been satisfied. The first integration can be referred to as coherent integration. If the first dwell time is satisfied, flowchart 400*a* proceeds to step 410. If the first dwell time is not satisfied, flowchart 400*a* proceeds to step 408. While two integration operations are used in the present embodiment, the present invention is also well-suited to using a single integration operation or using more than two integration operations.

In step 408, a new PN sequence is receive. The previous array of 16 PN sequence values used for the parallel correlation operation is subsequently indexed to include the new PN sequence value while maintain the array at a fixed length of 16 bits. As previously mentioned, the length of the array depends upon the needs of the user and the capabilities of the hardware and software. After completion of step 408, flowchart proceeds to step 404, thus performing a looping operation.

In step 410, the results from operations on I and Q components are squared then added to obtain an energy value. The product accumulators are then reset to zero, and the correlation and indexing operation continues. Flowchart 400c provides more specific details. Step 410 arises after the cycles designed for the first integration have been satisfied.

In step 412, an inquiry is made as to whether the number of cycles, "M," designated for the second integration have been satisfied. If the second number of cycles M has not been satisfied, then flowchart 400a proceeds to step 408. If the second number of cycles M has been satisfied, then flowchart 400a proceeds to step 414. The first number of cycles times the second number of cycles represents the dwell time of the operation.

In step 414, the results from the energy accumulators are output for subsequent evaluation. Then, the product accumulators and the energy accumulators are reset for a subsequent parallel search/correlation operation.

In step 416, the PN sequence is shifted from the initial PN sequence values to PN sequence values by the length of the original PN sequence. Because the present embodiment uses 16 PN values in parallel, the newly incremented PN sequence will represent a phase shift of 17th to 31st compared to the original 16 PN values used. A delay will occur while the input signal increments itself to the beginning of the period with which the search/correlate operation started. In this manner, the first input signal sample will be multiplied by the 17th PN sequence value through the 31st PN sequence value. In an alternative embodiment, the PN sequence values can be incremented by 16 sequence values from the end of the dwell time and correlated with the very next input signal sample. In this manner, the correlation operation does not have to wait for the input signal to restart its period.

In step 418, an inquiry is made as to whether phase shifts through the period of the PN sequence has been satisfied. If phase shifts through the period of the PN sequence have been satisfied, then flowchart 400a ends. If phase shifts through the period of the PN sequence have not been satisfied, then flowchart 400a proceeds to step 404 to repeat the correlation/searching operation. In this manner, the PN sequences around the PN sequence period are all correlated.

Thus, the present invention provides a method that performs a parallel correlation/search operation 16 PN sequence values wide. In this manner, the present invention can obtain the CDMA system at least sixteen times faster than the conventional serial method.

Figure 4B:
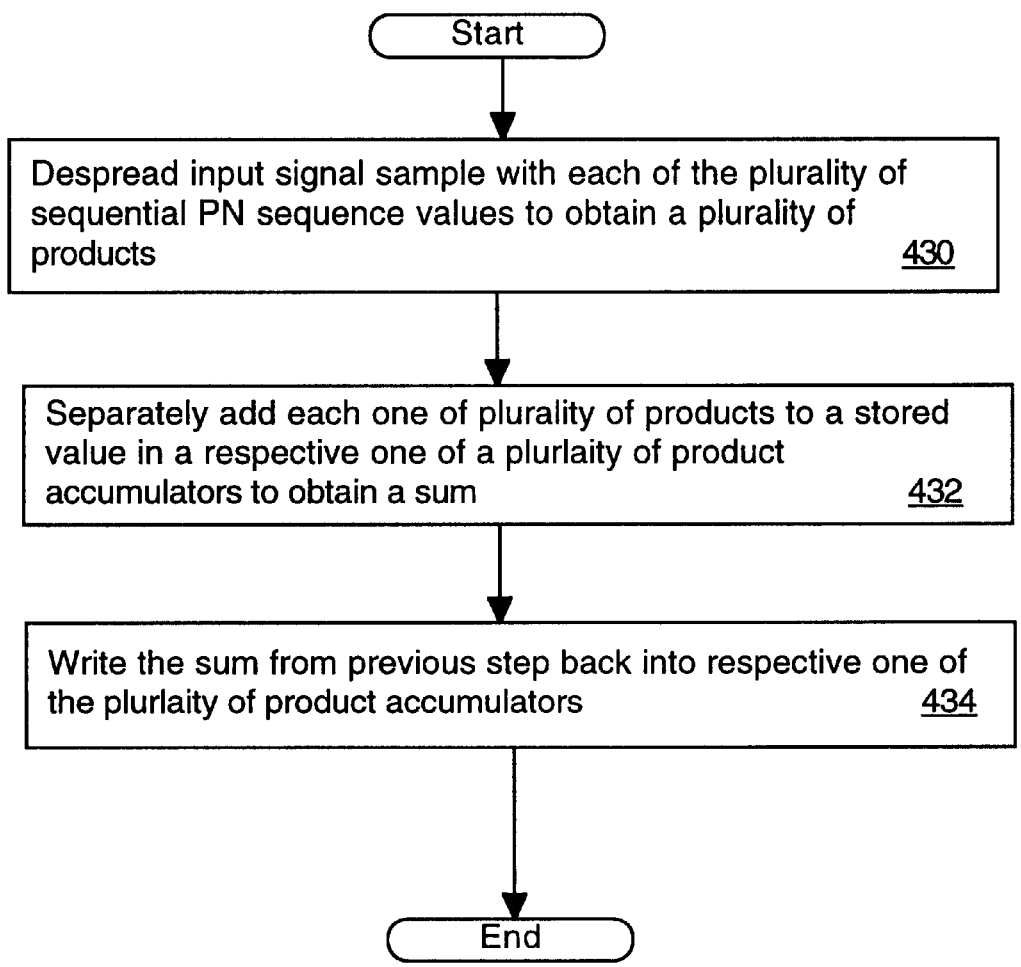
FIG. 4b is a flow chart of the steps to perform the parallel correlation portion of the search operation, in accordance with one embodiment of the present invention.

Referring now to FIG. 4b, a flow chart 400b of the steps to perform the parallel correlation operation is presented, in accordance with one embodiment of the present invention. By using the present embodiment, the present invention provides a method for expedient parallel search/correlation operation. FIG. 4a will be illustrated, at appropriate times, in combination with hardware portions of the invention illustrated in FIG. 3b. Flowchart 400b is comprised of the following steps.

In step 430, the input signal sample is correlated with one of the plurality of sequential PN sequence values to obtain a product. This process is accomplished by the quadrature despreader 354a and 354b illustrated in FIG. 3b. The quadrature despreader operates at a clock rate of sixteen times the input signal speed in the present embodiment. If the cell phone has a higher clock rate, a greater number of parallel multiplication operations can occur. Similarly, if parallel engines are utilized, then the effective speed of the multiplication operation can be increased.

In step 432, the product calculated from step 430 is added to the stored value in a respective one of a plurality of product accumulators. In this manner, the product accumulators maintain a running total of the respective sum of products generated for a plurality of phase shifts.

In step 434 the sum from the previous step is stored back in its respective product accumulator. Because the present embodiment performs 16 parallel search/correlation operations, for both I and Q phase, at 1/2 resolution, to simulate 16 parallel phase shifts occurring for every input sample analyzed, sixty-four accumulators are required to record the results. The present invention is applicable to other cases of resolution, and quantities of parallel search/correlation operations, with respective changes in the quantity of accumulators required to store the results.

Figure 4C:
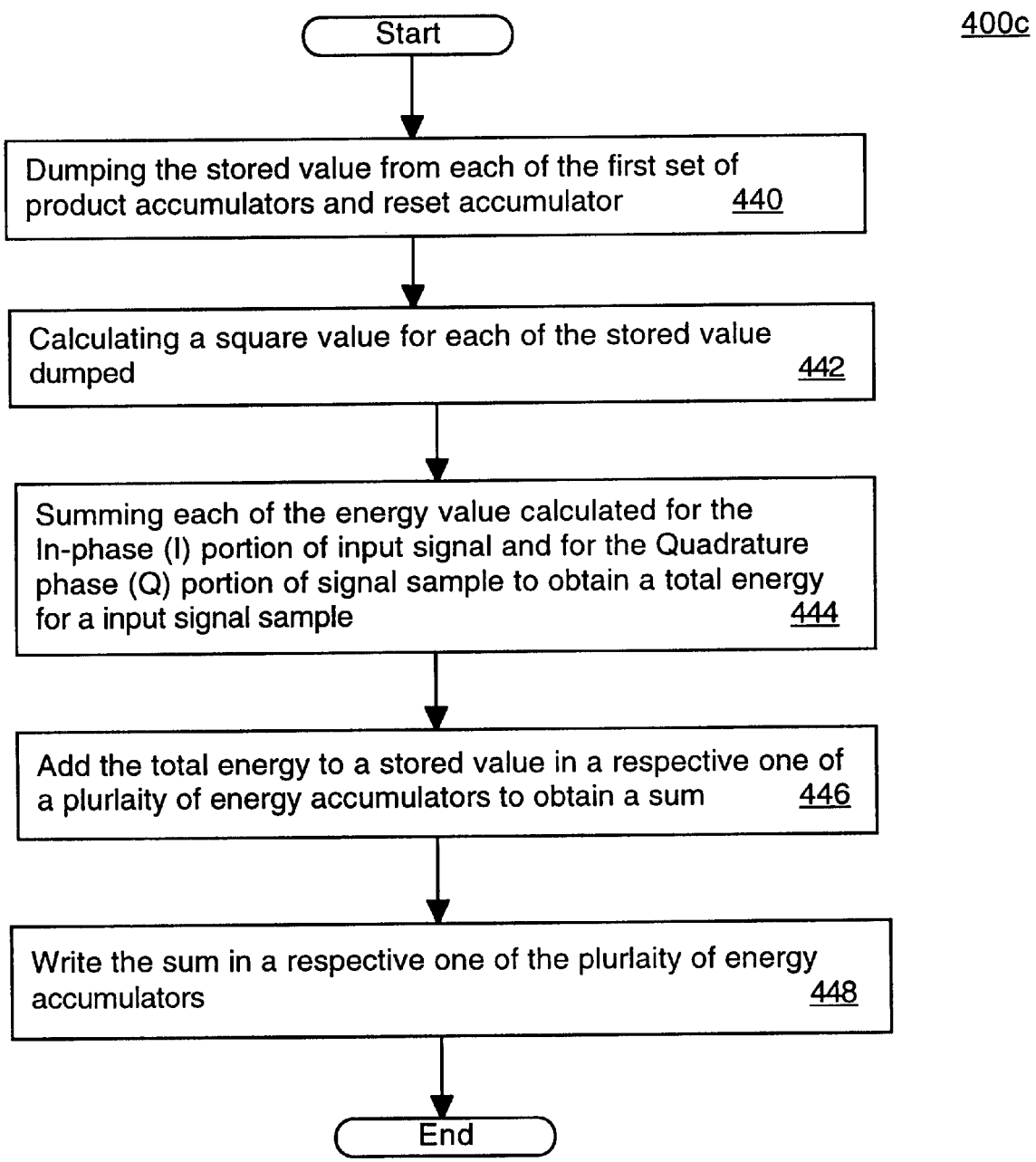
FIG. 4c is a flow chart of the steps to perform the energy calculation and accumulator reset portion of the search operation, in accordance with one embodiment of the present invention.

Referring now to FIG. 4c, a flow chart 400c of the steps to perform the energy calculation and accumulator reset portion of the search/correlation operation is presented, in accordance with one embodiment of the present invention. FIG. 4a will be illustrated in combination with hardware portions of the invention illustrated in FIG. 3b. Flowchart 400c is comprised of the following steps.

In step 440, the stored value from each of the first set of accumulators is dumped and the accumulator is reset for a subsequent searcher/collate operation. The steps in flowchart 400c have been illustrated in a previous example.

In step 442, a square value is calculated for each of the stored values dumped. The squaring operation is accomplished by a squaring circuit as illustrated in FIG. 3b.

In step 444, each of the squared value calculated for the I portion of the input signal and I PN sequence and the squared value calculated for the Q portion of the input signal and the Q PN sequence, for a given phase shift, are summed to provide a total energy for an input signal sample at a given phase shift.

In step 446, the total energy, from the previous step, is added to a stored value in a respective one of a plurality of energy accumulators to obtain a sum. In this manner, a running total of the energy, within the given dwell time, is gathered for subsequent evaluation.

In step 448, the sum from the previous step is written back to the respective one of the plurality of energy accumulators. In this manner, the running total is recorded for the subsequent iteration.

Several alternatives exist for the embodiment presented hereinabove. First, while the PN sequence used in the description has a period of 32,768 values, the present invention is applicable to any PN sequence.

Second, while a zero-phase offset was used for the internal PN generator to either start or resume a search/correlate operation, the present invention is suited to the use of any phase offset in an internal PN sequence generation. A zero-phase offset was used to simplify the description. This means that the internal PN generator can start generating the PN sequence at the beginning, middle or end of the PN sequence, but subsequent indexing takes into account the actual starting point.

In view of the embodiments described herein, the present invention provides a method and apparatus for determining if there are any nearby base stations to the cell phone and which of them has the strongest power signal. Furthermore, the present invention provides a method of how to identify each of the base stations. Additionally, the present invention provides a more expedient method to perform a search/correlation operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. In a communication system, a method of expediently correlating a pilot pseudonoise (PN) sequence with an incoming signal, said method comprising the steps of:
   a) providing a plurality of sequential PN sequence values forming an initial set of PN sequence values wherein said plurality of PN values forms an S bit array of PN sequence values;
   b) receiving an input signal sample;
   c) despreading said input signal sample with each of said plurality of sequential PN sequence values to obtain a plurality of products;
   d) adding each of said products to a stored value in a respective one of a plurality of product accumulators to obtain a plurality of sums;
   e) writing each of said sums back to said respective one of said plurality of product accumulators;
   f) receiving a new PN sequence value;
   g) indexing said S bit array to accommodate said new PN sequence value such that a new S bit array is formed having a plurality of PN sequence values;
   h) repeating steps b) through e) for said new S bit array;
   i) repeating steps f) through h) for N cycles;
   j) dumping said stored value from each of said plurality of first accumulators after said N cycles have occurred and resetting said stored value for each of said plurality of first accumulators; and
   k) calculating an energy value for said stored value dumped from each of said plurality of first accumulators wherein S and N are positive integers.

2. The method recited in claim 1 wherein said input signal sample occurs as a result of sampling at a first rate, and steps c) through e) are performed at a clock rate equivalent to said first rate times the quantity sequence values used in said initial set of PN sequence values.

3. The method recited in claim 1 further comprising the steps of:
   l) adding said total energy with a stored energy value from a respective one of a plurality of energy accumulators to obtain an energy sum;
   m) writing said energy sum into said respective one of said plurality of energy accumulators;
   n) repeating steps f) through m) for M cycles where M is a positive integer;
   o) dumping said stored energy value from each of said plurality of energy accumulators to a controller and resetting said stored energy value to zero for each of said plurality of energy accumulators;
   p) providing a new initial set of PN sequence values, said new initial set of PN sequence values incremented, away from said initial set of PN sequence of values used in step a), by said quantity of PN sequence values used in step a); and
   q) repeating steps b) through p) until phase shifts through the PN sequence have been accounted for.

4. The method recited in claim 3 wherein steps a) through p) are performed for each of a plurality of search engines, coupled to each other, as determined by the desired precision of said search operation.

5. A searcher providing an expedient search operation, said searcher comprising:
   an input lead for an in-phase signal;
   an input lead for a quadrature-phase signal;
   at least one quadrature despreader (QDS) coupled to said input lead for said in-phase signal and to said input lead for said quadrature-phase signal;
   at least one product accumulator (PA), said product accumulator coupled to said at least one QDS;
   at least one squaring circuit (SC), said at least one SC coupled to said at least one PA;
   at least one energy accumulator (EA), said at least one EA coupled to said at least one SC;
   an output lead;
   and a PN input lead; and
   a controller, said controller coupled to said at least one QDS, to said at least one PA, to said at least one SC, and to said PN input lead, and to said at least one EA said controller containing program instructions to execute a method for performing a parallel search/correlation operation, said method comprising the steps of:
   a) despreading an input signal sample with each of a plurality of PN sequence values to obtain a plurality of products, said multiplication step performed within the period of an input signal sample, thus effectively performing a parallel search over multiple phase shifts;
   b) accumulating each of said plurality of products separately;
   c) indexing said plurality of PN sequence values to yield a new plurality of PN sequence values;
   d) repeating steps a) and b) with said new plurality of PN sequence values, for N cycles;
   e) determining an energy for each of said plurality of products;
   f) repeating steps a) through e) for M cycles where M and N are positive integers;
   g) providing a new initial set of PN sequence values, said new initial set of PN sequence values incremented, away from said initial set of PN sequence values used in step a), by said quantity of PN sequence values used in step a); and
   h) repeating steps b) through g) until phase shifts through the entire PN sequence have been accommodated for.

* * * * *